(12) United States Patent
Eguchi

(10) Patent No.: US 10,587,775 B2
(45) Date of Patent: Mar. 10, 2020

(54) IMAGE PROCESSING APPARATUS, IMAGE PROCESSING METHOD, AND STORAGE MEDIUM FOR EDGE ENHANCEMENT BASED ON PLURAL CONDITIONS

(71) Applicant: CANON KABUSHIKI KAISHA, Tokyo (JP)

(72) Inventor: Kimimori Eguchi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/290,644

(22) Filed: Mar. 1, 2019

(65) Prior Publication Data
US 2019/0289168 A1 Sep. 19, 2019

(30) Foreign Application Priority Data

Mar. 15, 2018 (JP) ................................. 2018-048400

(51) Int. Cl.
| H04N 1/40 | (2006.01) |
| H04N 1/409 | (2006.01) |
| H04N 1/405 | (2006.01) |
| H04N 1/32 | (2006.01) |

(52) U.S. Cl.
CPC ....... *H04N 1/4092* (2013.01); *H04N 1/32256* (2013.01); *H04N 1/4055* (2013.01)

(58) Field of Classification Search
CPC combination set(s) only.
See application file for complete search history.

(56) References Cited

U.S. PATENT DOCUMENTS

| 5,023,919 A * | 6/1991 | Wataya | H04N 1/40062 348/625 |
| 5,508,823 A * | 4/1996 | Kiyohara | H04N 1/4092 358/447 |
| 6,075,902 A * | 6/2000 | Kojima | H04N 1/40075 358/448 |
| 6,775,031 B1 * | 8/2004 | Fujiwara | H04N 1/40062 358/2.1 |
| 7,995,243 B2 * | 8/2011 | Sakaue | H04N 1/405 358/1.11 |
| 8,330,995 B2 | 12/2012 | Eguchi | 358/3.27 |
| 10,115,011 B2 * | 10/2018 | Ouchi | G06K 9/00463 |

FOREIGN PATENT DOCUMENTS

| JP | 2003018403 A * | 1/2003 | G06T 5/10 |
| JP | 2015-049631 | 3/2015 | |

* cited by examiner

*Primary Examiner* — Barbara D Reinier
(74) *Attorney, Agent, or Firm* — Venable LLP

(57) ABSTRACT

An information processing apparatus and an image processing method are provided. The image processing apparatus detects character data from image data, executes edge enhancement processing, using a first filter, on an edge portion of a region, out of the detected character data, that includes a region whose frequency of points or lines is greater than a predetermined frequency, and executes edge enhancement processing, using a second filter, on an edge portion of a region, out of the detected character data, that does not include a region of a spatial frequency higher than the predetermined frequency. The first filter has, in comparison to the second filter, a larger degree for edge enhancement with respect to a region having a frequency higher than the predetermined frequency.

12 Claims, 15 Drawing Sheets

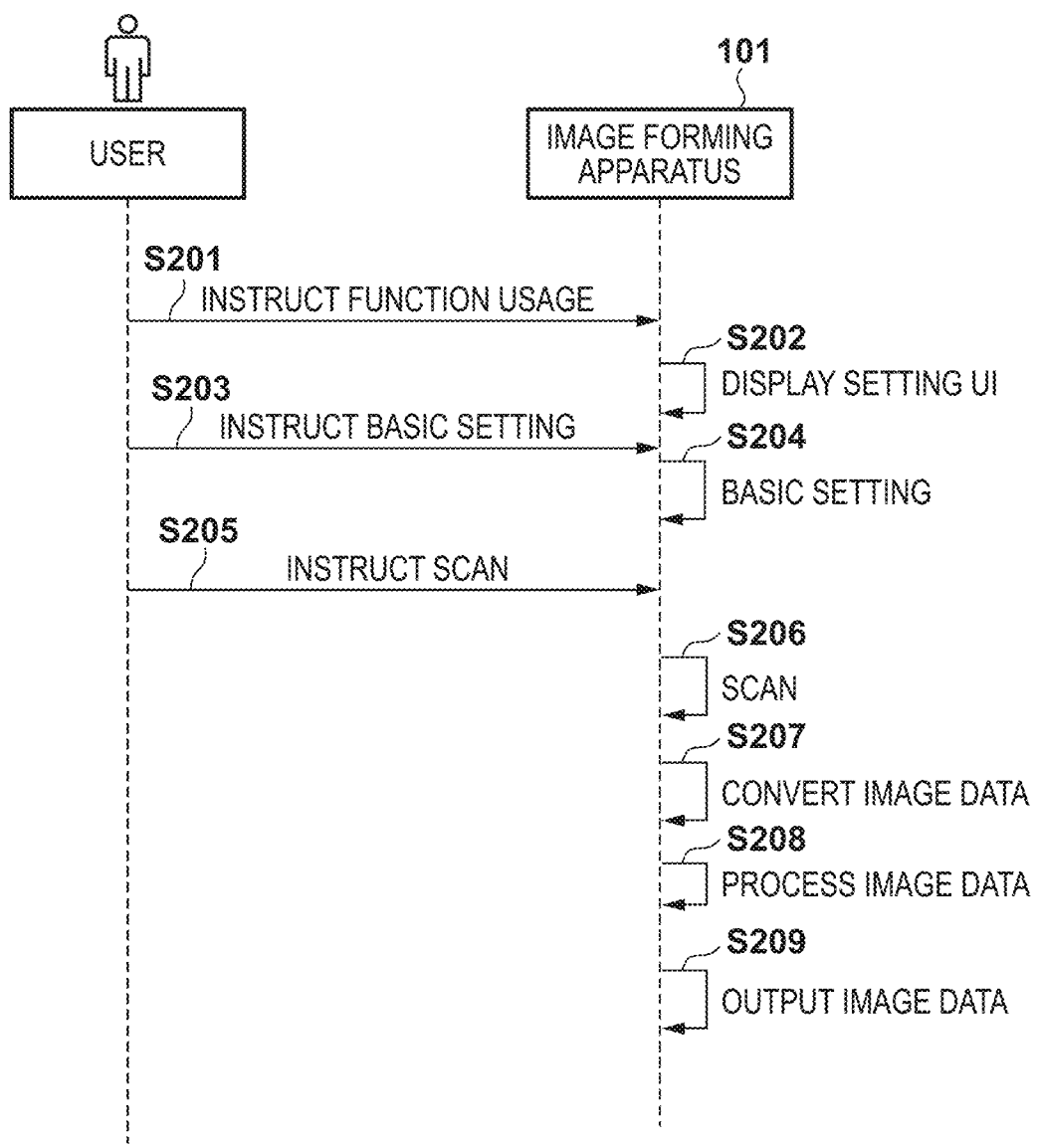

IMAGE PROCESSING APPARATUS, IMAGE PROCESSING METHOD, AND STORAGE MEDIUM FOR EDGE ENHANCEMENT BASED ON PLURAL CONDITIONS

BACKGROUND OF THE INVENTION

Field of the Invention

The present invention relates to an image processing apparatus, an image processing method, and a storage medium.

Description of the Related Art

Nowadays, in an image forming apparatus such as an MFP (Multifunction Printer), an original is read by a scanner or ADF (Auto Document Feeder) that is attached, various image processing is performed on image data obtained by the read, and then the image data is copied, saved, or transmitted. Here, the image processing includes image area determination processing for determining a character region and a photo region of the original, processing for color space conversion, processing for correcting a decrease in sharpness that occurs in accordance with an MTF (Modulation Transfer Function) of the scanner, or the like.

In Japanese Patent Laid-Open No. 2015-49631, with respect to an image whose sharpness has decreased due to the MTF of a scanner, the character size of an original is estimated, and edge enhancement using a filter having a characteristic that a response for a high-frequency range (hereinafter, a high-frequency component) of spatial frequencies is high is performed on small characters. In contrast, it is recited that filter processing in which edge enhancement using a filter having a characteristic that a response for a medium-frequency range (hereinafter, a medium-frequency component) for spatial frequencies is high is performed on large characters.

However, spatial frequency characteristics differ in accordance with font types and the complexity of a character itself, and not just the size of a character. In addition, even for a single character, it is not necessarily the case that edges will be enhanced using the optimal filter with the method recited in the aforementioned Japanese Patent Laid-Open No. 2015-49631 due to the character being configured by lines or points having various frequency characteristics.

SUMMARY OF THE INVENTION

An aspect of the present invention is to eliminate the above-mentioned problem with conventional technology.

A feature of the present invention is to provide a technique that is able to clearly represent both a portion where a line of a character is thin and a portion where a line of a character is thick.

According to a first aspect of the present invention, there is provided an information processing apparatus comprising: a controller, having at least one processor which executes instructions stored in a memory, one or more circuitry, or, a combination of the at least one processor and the one or more circuitry, being configured to: detect character data from image data; execute edge enhancement processing, using a first filter, on an edge portion of a region, out of the detected character data, that includes a region whose frequency of points or lines is greater than a predetermined frequency; and execute edge enhancement processing, using a second filter, on an edge portion of a region, out of the detected character data, that does not include a region of a spatial frequency higher than the predetermined frequency, wherein the first filter has, in comparison to the second filter, a larger degree for edge enhancement with respect to a region having a frequency higher than the predetermined frequency.

According to a second aspect of the present invention, there is provided an image processing method of an image processing apparatus, the image processing method comprising: detecting character data from image data; executing edge enhancement processing, using a first filter, on an edge portion of a region, out of the detected character data, that includes a region whose frequency of points or lines is greater than a predetermined frequency; and executing edge enhancement processing, using a second filter, on an edge portion of a region, out of the detected character data, that does not include a region of a spatial frequency higher than the predetermined frequency, wherein the first filter has, in comparison to the second filter, a larger degree for edge enhancement with respect to a region having a frequency higher than the predetermined frequency.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a sequence diagram illustrating a flow of processing when a user instructs copying with respect to an image forming apparatus according to the first embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that, in the present embodiment, for example an image forming apparatus such as a multi-function peripheral is given as an example of an image processing apparatus, but the present invention is not limited to such an image forming apparatus, and can be applied to, for example, a communication apparatus, an information terminal, a PC, or the like.

First Embodiment

Figure 1:
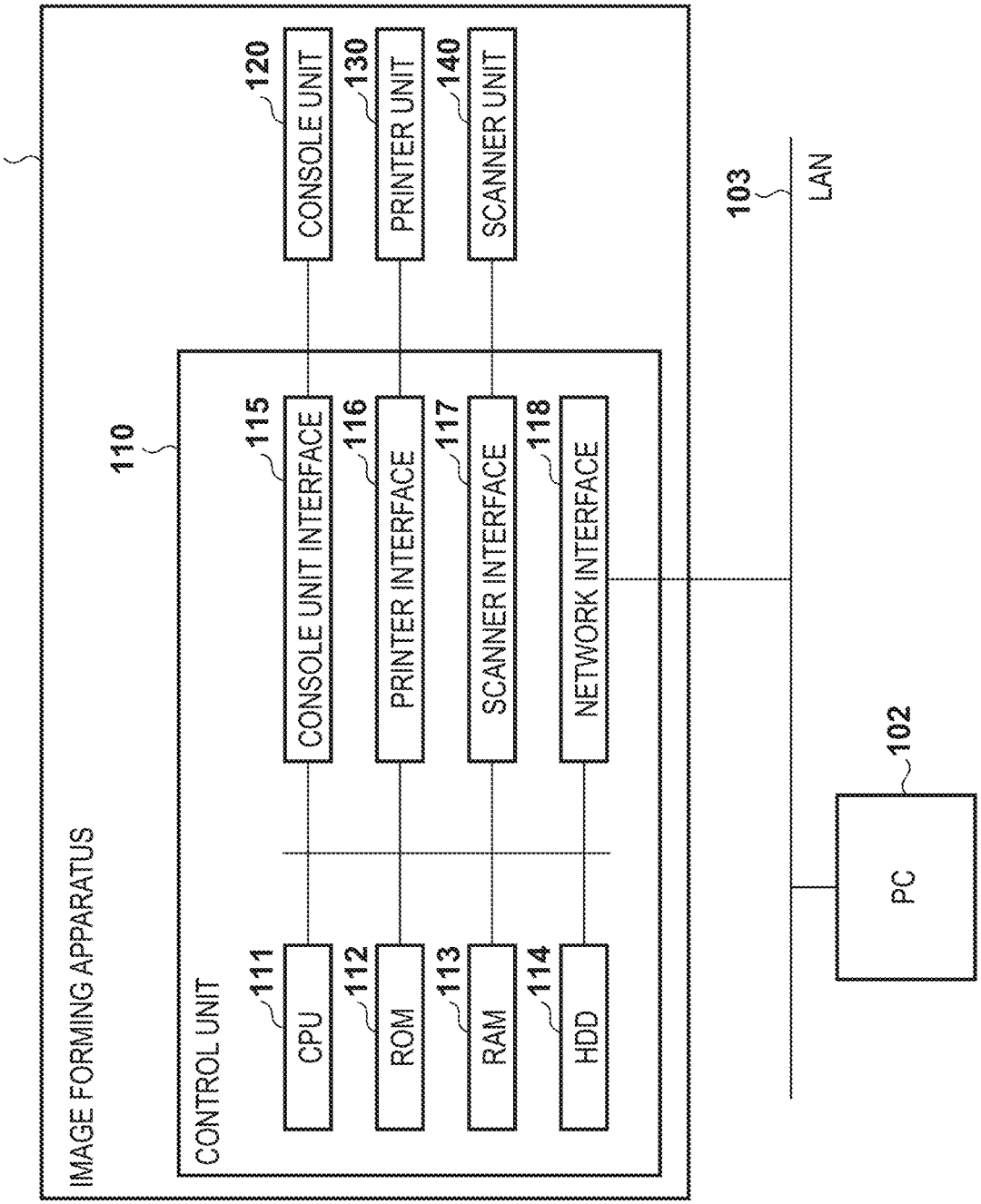
FIG. 1 depicts a view for describing an overall configuration of a print system according to a first embodiment of the present invention.

FIG. 1 depicts a view for describing an overall configuration of a print system according to the first embodiment of the present invention.

This print system has an image forming apparatus 101 that is a multi-function peripheral (MFP) capable of copy processing, and a PC 102, and these are communicably connected to each other via a LAN 103. Image data to be printed that is written in Page Description Language (PDL) (hereinafter, PDL data) is transmitted from the PC 102 to the image forming apparatus 101 via the LAN 103, and printed out. In addition, FIG. 1 also illustrates an internal configuration (a hardware configuration) of the image forming apparatus 101. Hereinafter, the internal configuration of the image forming apparatus 101 will be described.

A control unit 110 that includes a CPU 111 controls operation of the entirety of the image forming apparatus 101. The CPU 111 executes a boot program stored in a ROM 112 to deploy a program stored in a HDD 114 to a RAM 113, and executes the deployed program to perform various control such as reading control or transmission control. The CPU 111 may be a single processor, and may be configured by a plurality of processors. The RAM 113 is used as a temporary storage region such as a work area or a main memory of the CPU 111. The HDD 114 stores image data, various programs, and various information tables.

A console unit interface 115 is an interface for connecting a console unit 120 with the control unit 110. The console unit 120 includes a keyboard or a display having a touch panel function, and is responsible for a user interface function of accepting various input operations from a user. In a case of performing user authentication such as by an ID card, the console unit 120 is provided with a user authentication unit (not shown) for accepting an authentication operation. A printer interface 116 is an interface for connecting a printer unit 130 and the control unit 110. Image data that is to be subjected to print processing by the printer unit 130 is inputted from the control unit 110 via the printer interface 116. In the printer unit 130, an image in accordance with inputted image data is printed onto a recording medium such as paper by a predetermined method (an electrophotographic method here). A scanner interface 117 is an interface for connecting a scanner unit 140 and the control unit 110. The scanner unit 140 generates image data (scanned image data) by reading an image of an original on an original platen (not shown), or an original fed from the ADF (an automatic document feeder). The generated scanned image data is inputted to the control unit 110 via the scanner interface 117. A network interface 118 is an interface for connecting the control unit 110 (the image forming apparatus 101) with the LAN 103. The network interface 118 transmits image data or information to a non-illustrated external apparatus (for example, a cloud service server) on the LAN 103, and receives various information from the external apparatus on the LAN 103.

Figure 3A:
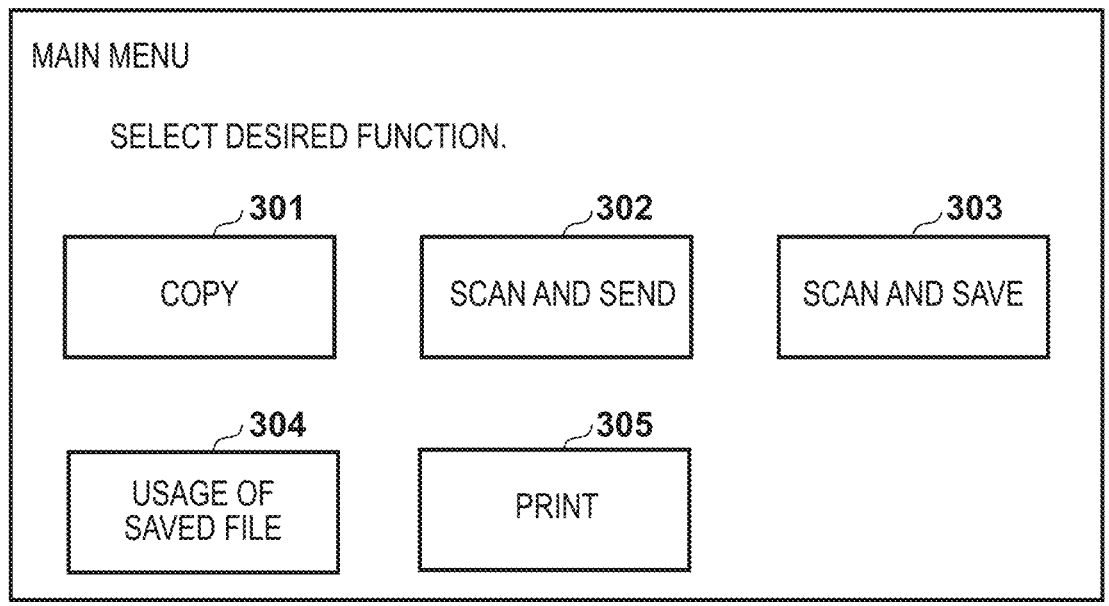
FIGS. 3A and 3B depict views respectively illustrating examples of screen displayed on a console unit of the image forming apparatus according to the first embodiment.
Figure 3B:
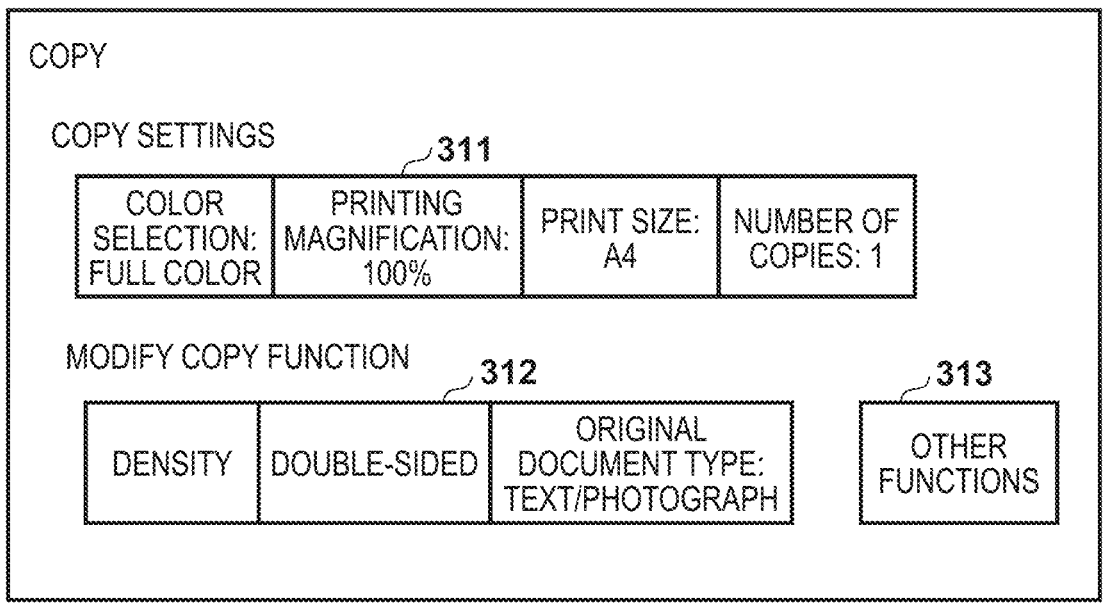

Next, with reference to the sequence diagram of FIG. 2 and the UI diagrams illustrated in FIGS. 3A and 3B, description is given in detail for an exchange between a user who instructs execution of a copy function, and the image forming apparatus 101. Note that operation of the image forming apparatus 101 is realized by the CPU 111 executing a program that has been deployed to the RAM 113.

FIG. 2 is a sequence diagram for describing a flow of processing when a user instructs copying with respect to the image forming apparatus 101 according to the first embodiment.

In a function usage instruction of step S201, a user makes an instruction for copying via the console unit 120 of the image forming apparatus 101.

FIG. 3A illustrates an example of a main menu screen that is displayed on the console unit 120. In the main menu screen, functions that can be performed by the image forming apparatus 101 are displayed as buttons. For example, a copy button 301, a "scan and send" button 302, a "scan and save" button 303, a "usage of saved file" button 304, and a print button 305 are displayed. From these, a user presses a button corresponding to a function they wish to have performed. When making an instruction for the copy function, a user presses the copy button 301. In step S201, the image forming apparatus 101 accepts the press of the copy button 301.

In the setting UI display of step S202, an initial state screen for various settings for the copy function is displayed on the console unit 120 of the image forming apparatus 101.

FIG. 3B illustrates an example of a copy function setting screen that is displayed on the console unit 120.

Here, for example, in copy settings 311, states for color selection, selection of printing magnification, selection of original/print size, and selection of a number of copies are displayed. In addition, copy function modifications 312 displays many settings that are used with the copy function, such as a selection for adjustment of printing density, selection of double-sided printing, and a type of original. In addition, at another function setting 313, a button that enables an application function used for a specific purpose to be selected and set is arranged.

In the basic setting instruction of step S203, the image forming apparatus 101 accepts a basic setting instruction for the copy function from a user. For example, it accepts a press of the copy setting 311, and accepts an instruction such as for a selection to print in color, a magnification selection, a selection for original/print size, or a selection for a number of copies.

In a basic setting of step S204, a basic setting for the copy function selected by a user is stored in the RAM 113 of the image forming apparatus 101 as a setting value.

Subsequently, a user makes a scan instruction via the console unit 120 in step S205. By this, the image forming apparatus 101 starts a scan operation after accepting scan execution from a user. In step S206, the image forming apparatus 101 makes an instruction for reading an original to the scanner unit 140. By this the scanner unit 140 drives a scanner engine (not shown) to read an original placed on a glass plate of the scanner unit 140 or an original fed from the ADF. In step S207, the image forming apparatus 101 converts image data generated by the scanner unit 140 reading an original into image data of a bitmap format which can be handled by image processing. In step S208, image processing for copying is performed on the image data. Note that filter processing for performing edge enhancement is performed here. Next, in step S209, the image forming apparatus 101 executes printing by outputting the image data to which the image processing has been performed to the printer unit 130. In this way, the image forming apparatus 101 can output a copy result that is instructed by a user. The image data conversion processing of step S207, the image processing of step S208 and the image output processing of S209 are described in detail below.

Figure 4:
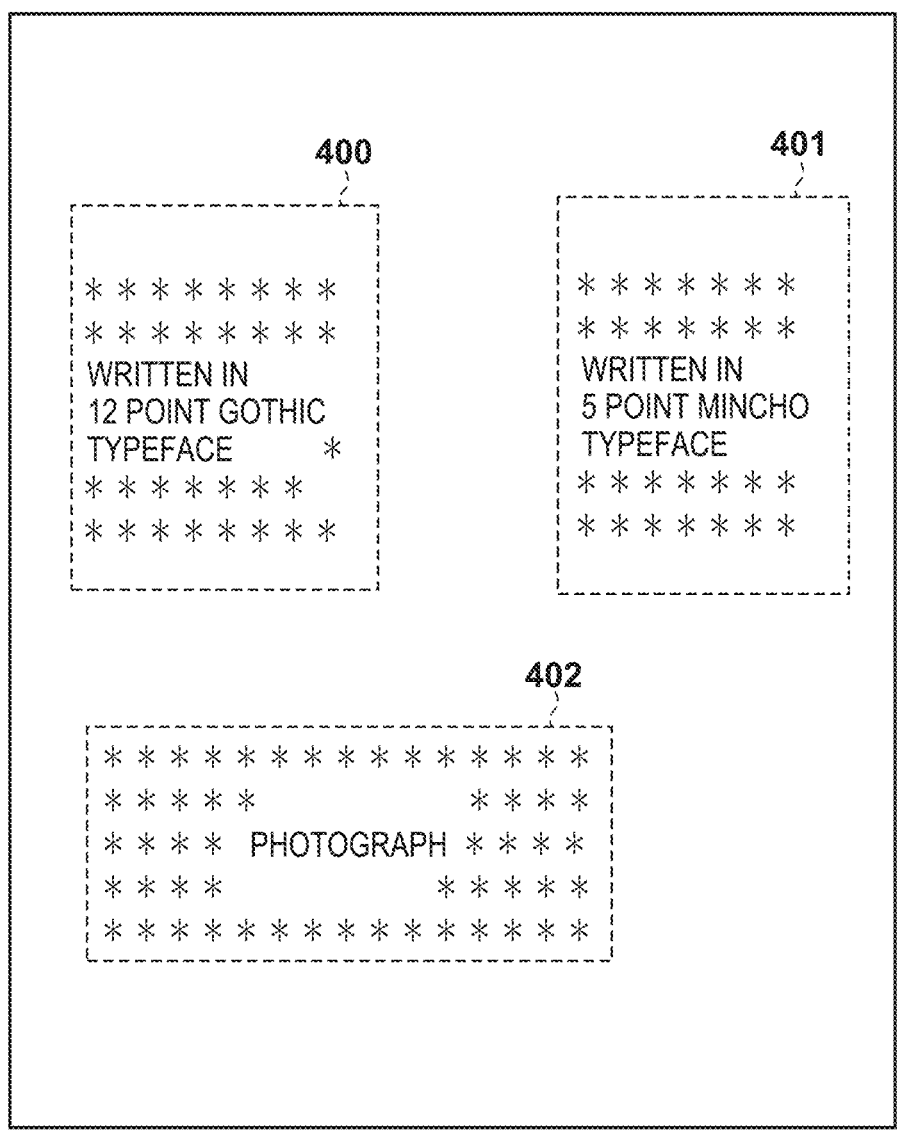
FIG. 4 depicts a view illustrating an example of image data obtained by reading an original in step S206 of FIG. 2.

FIG. 4 depicts a view illustrating an example of image data obtained by reading an original in step S206 of FIG. 2.

The original illustrated by FIG. 4 includes a region 400 that includes thick characters (bold letters) such as a gothic typeface of 10 points or more, a region 401 that includes thin characters such as a Mincho typeface of 5 points or less, and a photograph region 402.

Figure 5:
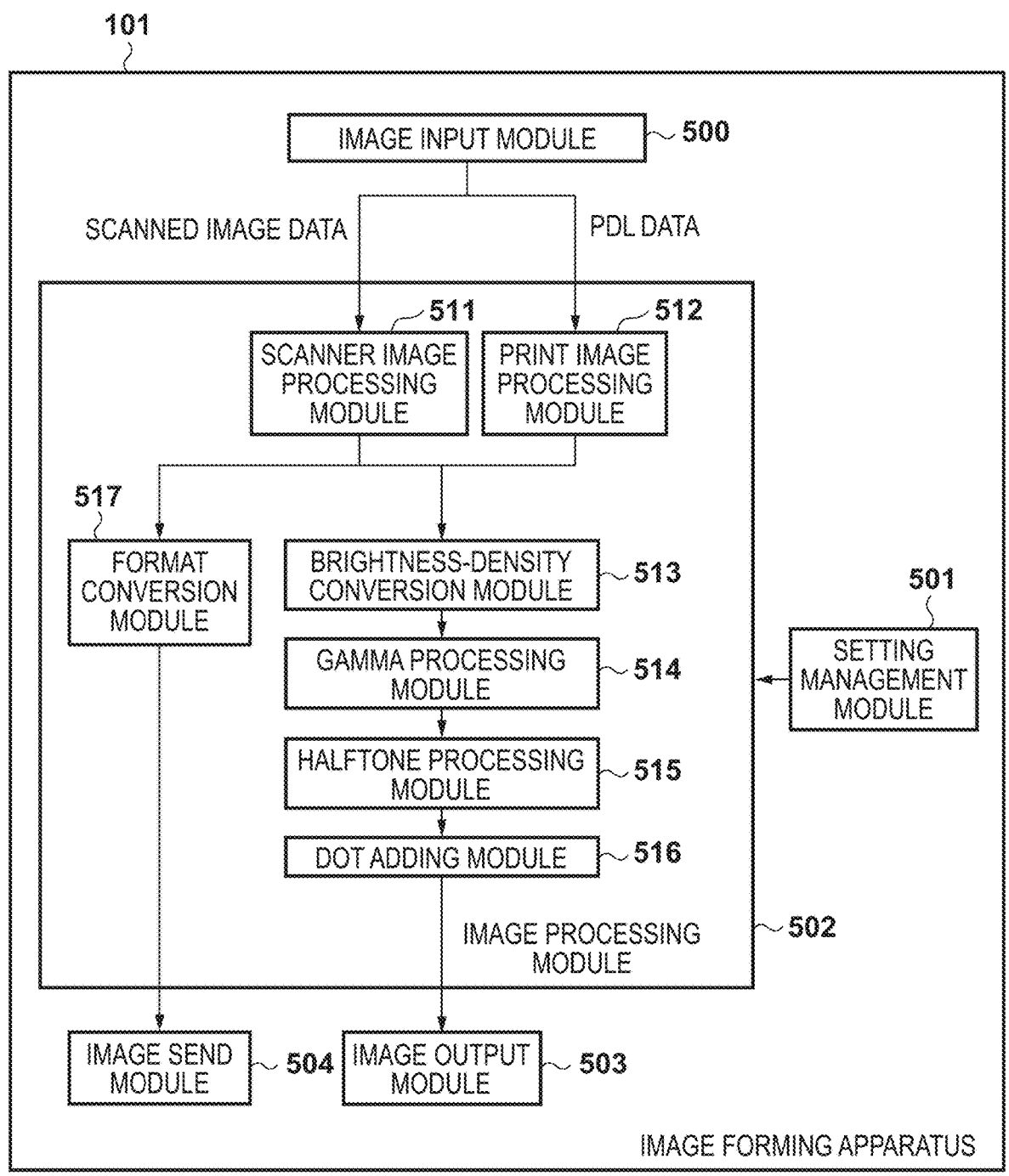
FIG. 5 is a functional block diagram for describing a software configuration for realizing functions of the image forming apparatus according to the first embodiment.

FIG. 5 is a functional block diagram for describing a software configuration for realizing functions of the image forming apparatus 101 according to the first embodiment.

The image forming apparatus 101 is provided with an image input module 500, a setting management module 501, an image processing module 502, an image output module 503, and an image send module 504. Each functional module of the image forming apparatus 101 is realized by the CPU 111 executing a program that has been deployed to the aforementioned RAM 113. Description is given regarding each functional module below.

The image input module 500 accepts input of image data in accordance with the copy function, the scan and send function, or the print function that the image forming apparatus 101 has. For example, if the copy function or the scan and send function is executed, scanned image data is obtained from the scanner unit 140. In addition, if the print function is executed, the PDL data is obtained from the PC 102.

The setting management module 501 manages various setting values for various image processing that is executed by the image processing module 502. Furthermore, the setting management module 501 obtains a setting value by accepting a user instruction via a UI screen displayed on the console unit 120, and also performs control for managing the setting value.

The image processing module 502 performs various image processing, in accordance with a function used, on image data inputted by the image input module 500. The image processing module 502 has a scanner image processing module 511, a print image processing module 512, a brightness-density conversion module 513, a gamma processing module 514, a halftone processing module 515, a dot adding module 516, and a format conversion module 517.

The image output module 503 prints an image based on image data that has been processed by the image processing module 502. In addition, the image send module 504 transmits image data that has been subject to a format conversion and processed by the image processing module 502.

Figure 6:
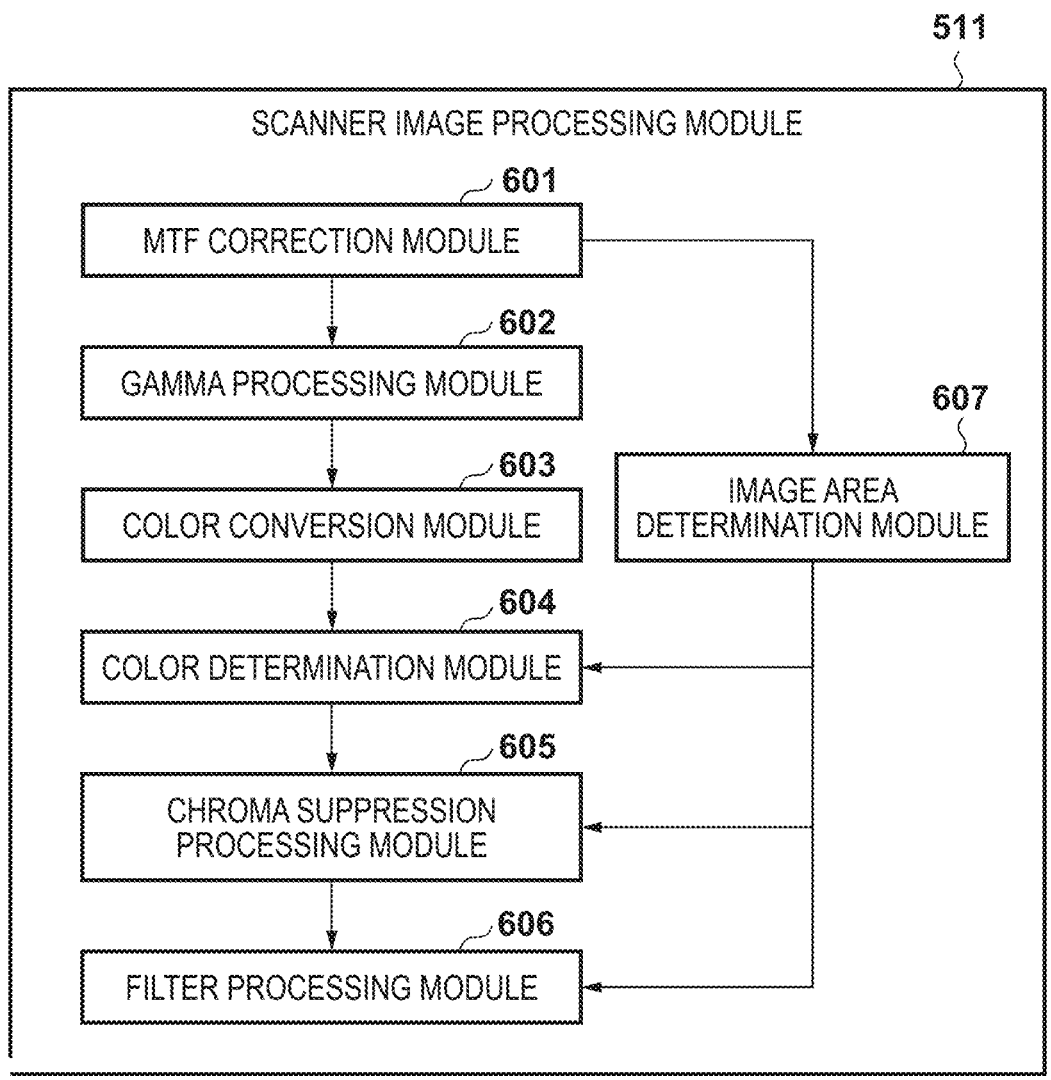
FIG. 6 is a block diagram for describing an example of a functional configuration of a scanner image processing module according to the first embodiment.

FIG. 6 is a block diagram illustrating an example of a functional configuration of the scanner image processing module 511 according to the first embodiment. The scanner image processing module 511 performs necessary image processing on scanned image data.

The scanner image processing module 511 has an MTF correction module 601, a gamma processing module 602, a color conversion module 603, a color determination module 604, a chroma suppression processing module 605, a filter processing module 606, and an image area determination module 607.

Next, description is given for processing performed by each processing module of FIG. 6.

Firstly, the MTF correction module 601 corrects a reading MTF that changes in accordance with the reading speed. The gamma processing module 602 performs a one-dimensional gamma conversion in accordance with a characteristic of the scanner unit 140. The color conversion module 603 performs a color conversion from a color space held by the scanner unit 140 to a color space that does not depend on the scanner unit 140. The image area determination module 607 uses the image data processed by the MTF correction module 601 to determine image areas such as for characters or photographs, and generate image area information. The color determination module 604 uses this image area information to make a determination between chromatic color or achromatic color. The chroma suppression processing module 605 uses the image area information to correct RGB amounts with respect to image data determined to be achromatic color. For example, when achromatic color is determined in the color determination module 604, processing such as making R, G, and B amounts equal is performed. The filter processing module 606 uses the image area information to perform smoothing, edge enhancement, or the like. Here, details of the relation between the image area determination module 607 and the filter processing module 606 are described later.

Note that, in the first embodiment, description is given for an example where edge enhancement is performed by the scanner image processing module 511, but, for example, filter processing may be performed after the brightness-density conversion module 513 which is described below.

The print image processing module 512 performs image processing that is necessary when executing a print function, for example, processing for interpreting PDL data and generating intermediate data, RIP processing for converting the intermediate data to data in a bitmap format that can be interpreted by the printer unit 130, or the like. At a time of this RIP processing, processing for generating attribute information that is described above is also performed.

The brightness-density conversion module 513 performs processing for converting a color space (for example, RGB) of the image data generated by the scanner image processing module 511 or the print image processing module 512 to a color space supported by the printer unit 130 (for example, CMYK). Note that image data whose color space is CMYK when inputted to the brightness-density conversion module 513 is sent to the gamma processing module 514 unchanged. The gamma processing module 514 performs processing for correcting density modulation of the printer unit 130 to a predefined characteristic. The halftone processing module 515 performs processing for converting tone values (for example, 256 tones) of the input image data to obtain image data (halftone image data) of N values (for example, 2 values) which are the tones that can be outputted by the printer unit 130. The dot adding module 516 adds dots that have been defined in advance. The image output module 503 outputs halftone image data, as a result of performing various image processing on the inputted image data, to the printer unit 130 via the printer interface 116.

The format conversion module 517 converts image data generated by the scanner image processing module 511 to a general-purpose format that can be transmitted. For example, it converts to a JPEG format or a PDF format. The image send module 504 transmits image data, which is a result of performing various image processing to the inputted image data, to the PC 102 or the like via the network interface and the LAN 103.

Next, description is given in detail for processing of step S207 through step S209 of FIG. 2 which was described earlier.

In the image data conversion of step S207, inside the image input module 500, the image data obtained by the scanning of step S206 is converted to image data of a bitmap format that can be handled in image processing. In the image processing of step S208, in a case of the copy function, the scanned image data generated by the image formation of step S207 is obtained, and a color conversion or the like is performed in the color conversion module 603 inside the scanner image processing module 511. Next, the brightness-density conversion module 513, the gamma processing module 514, the halftone processing module 515, and the dot adding module 516 are executed.

In the image output of step S209, printing of the generated image data is executed by the image output module 503. When printing is executed, the image forming apparatus 101 outputs an original that is a copy result and has been printed by the printer unit 130.

The relation between the aforementioned image area determination module 607 and filter processing module 606 of FIG. 6 is described in detail below.

If a determination result by the image area determination module 607 is "character", filter processing for enhancing edges is performed in the filter processing module 606. Description is given below regarding details thereof, with reference to FIG. 4 and FIGS. 10A and 10B.

Figure 10A:
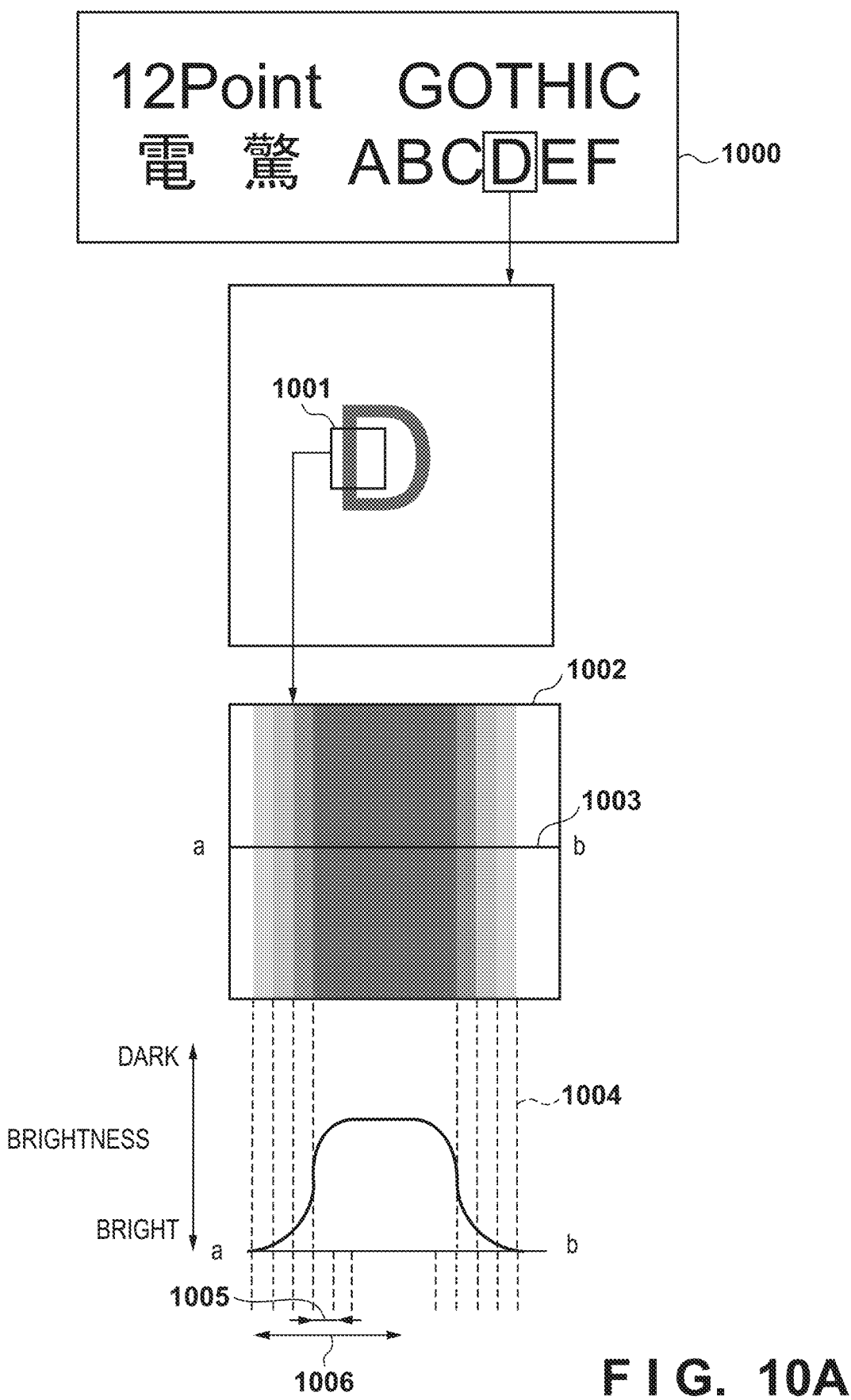
FIG. 10A depicts a view for describing sharpening of a character of a text region.

Firstly, it is assumed that a text region of the region 400 of FIG. 4 which is an image obtained by reading an original by the scanner unit 140 made up of characters as indicated by the reference numeral 1000 of FIG. 10A. In such a case, an enlargement of a portion 1001 of the character "D" therein is indicated by a region 1002. In the region 1002, it is seen that the sharpness of edges has decreased. The density of a cross section 1003 of a-b here is indicated by reference numeral 1004.

With this example of image data, the image area determination module 607 determines that a region 1005 has an edge attribute and a region 1006 has a character attribute. Note that the edge attribute is extracted in accordance with a threshold value defined in advance by edge extraction processing, and the character attribute is obtained by thickening the edge attribute by several pixels. For example, in FIG. 10A, it is thickened by three pixels from the edge attribute. A reason for this thickening is because, for an image inputted from the scanner unit 140, the sharpness has decreased as in the a-b cross section, and several pixels remain outside of the edge region 1005.

Figure 10B:
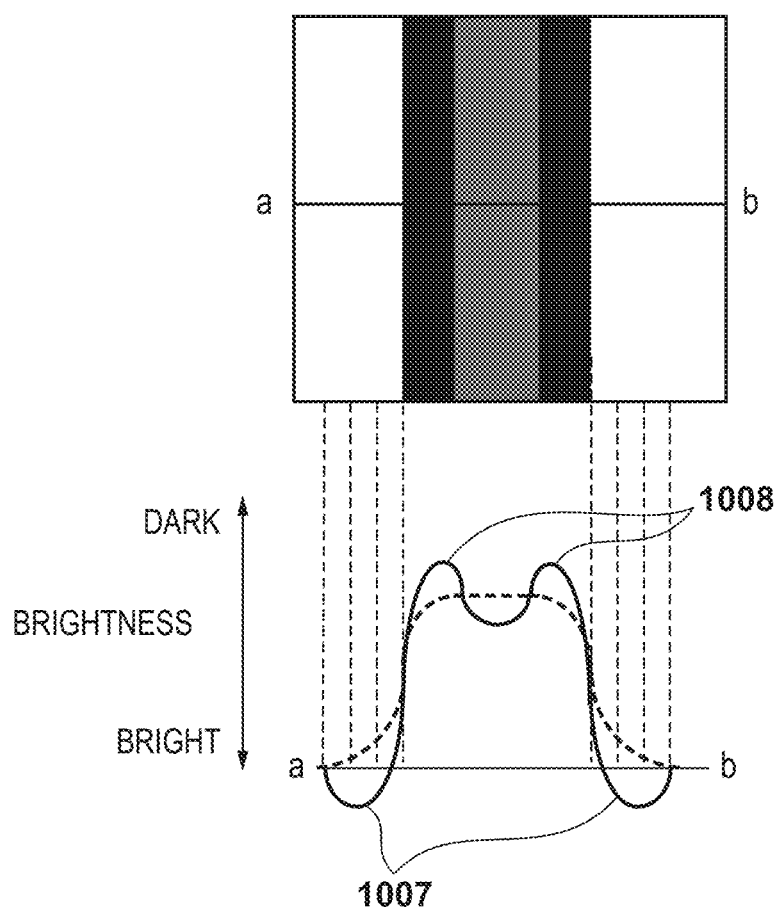
FIG. 10B depicts a view for describing sharpening of a character of a text region.

The filter processing module 606 can then perform filter processing for enhancing the edge that is applied to the character region to thereby, as illustrated by reference numeral 1007 of FIG. 10B, by removing pixels around the character by an undershoot effect, enhance an edge portion 1008 of the character region. This effect is illustrated by FIG. 10B. In addition, this filter can be calculated in accordance with weighted averaging of 7×7 pixels centered on a target pixel, and coefficients corresponding to the 7×7 pixels. The size of the filter may be a large filter that is 7×7 pixels or more, or may be a small filter that is 7×7 pixels or less.

In contrast, when a determination result by the image area determination module 607 is a halftone dot (a photo region), the filter processing module 606 performs filter processing for performing smoothing to remove the halftone dot structure of the original, and then performs filter processing for enhancing edges. Description is given below regarding details thereof, with reference to FIG. 4 and FIG. 11.

Figure 11:
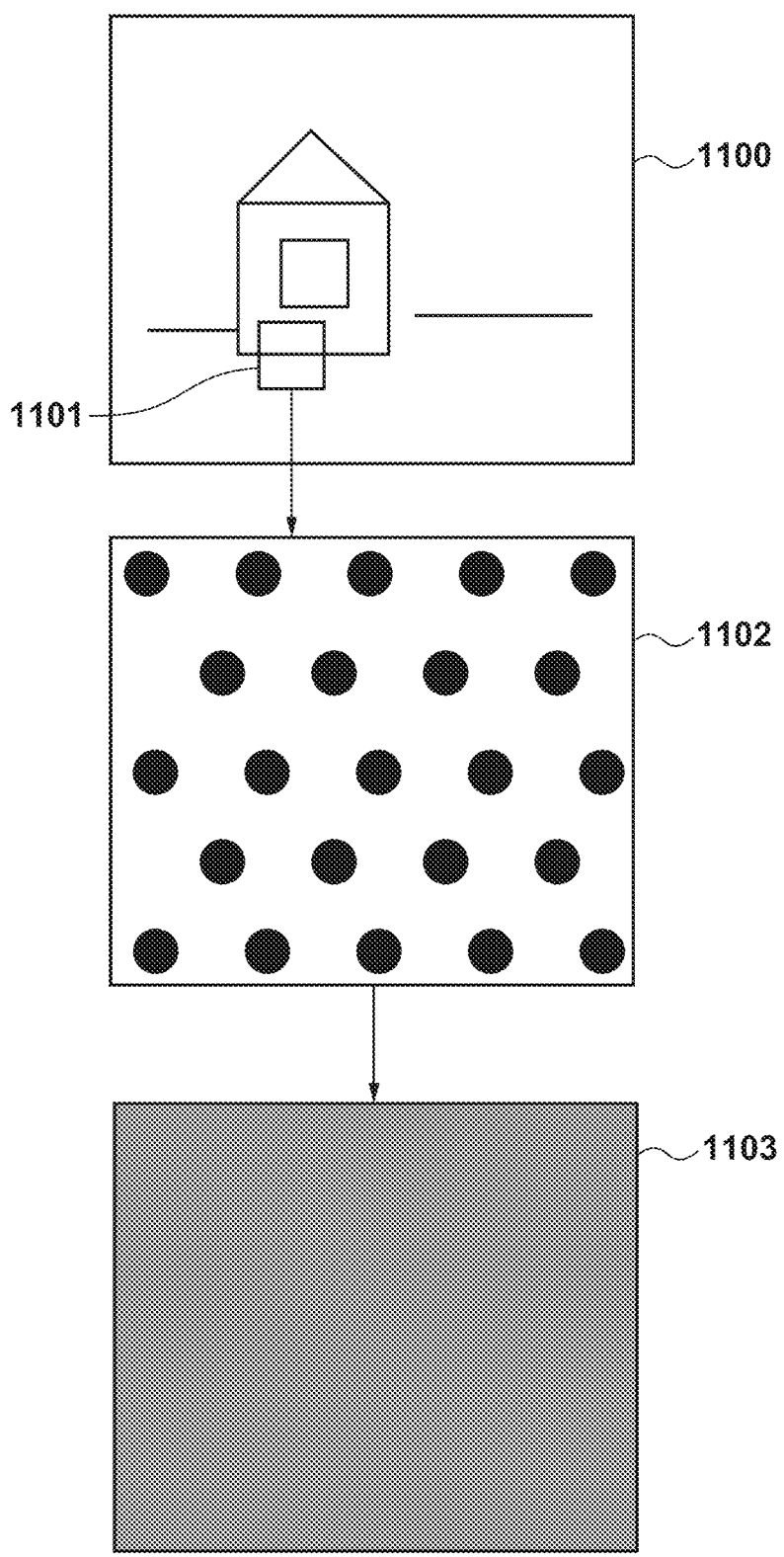
FIG. 11 depicts a view for describing smoothing of a photograph region.

Firstly, when an image 1100 of FIG. 11 which is an example of the photo region of the region 402 of FIG. 4 is expanded, it is formed by a plurality of halftone dots as illustrated by 1102. By performing filter processing for performing smoothing to remove this halftone dot structure so that moire does not occur during screen processing in the halftone processing module 515, a conversion is made to what is illustrated by reference numeral 1103. Because the edge portion of the photograph is also smoothed by this, sharpness decreases, and therefore filter processing to enhance edges is performed. By this, it is possible to maintain the sharpness of the edge portion even though the halftone dot structure of the photo region is removed.

Figure 12A:
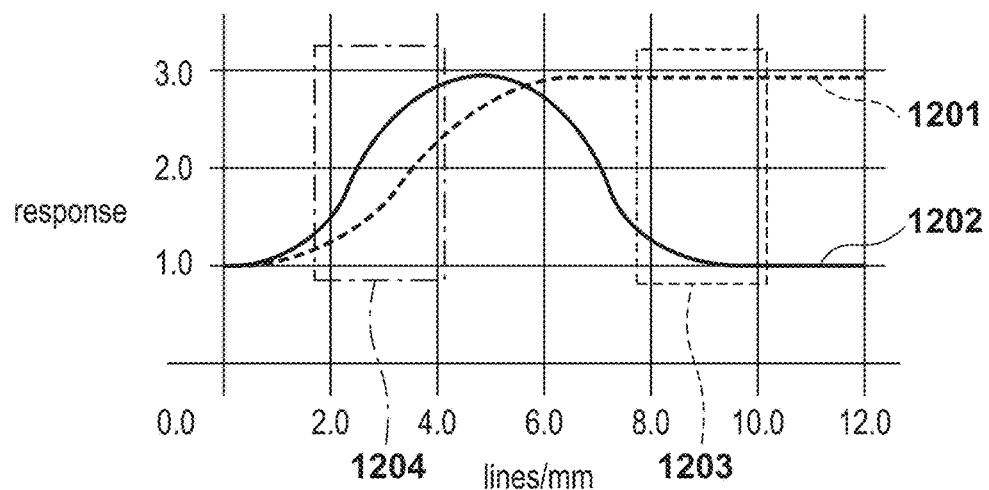
FIGS. 12A to 12C depict views for describing frequency characteristics of a filter.
Figure 12B:
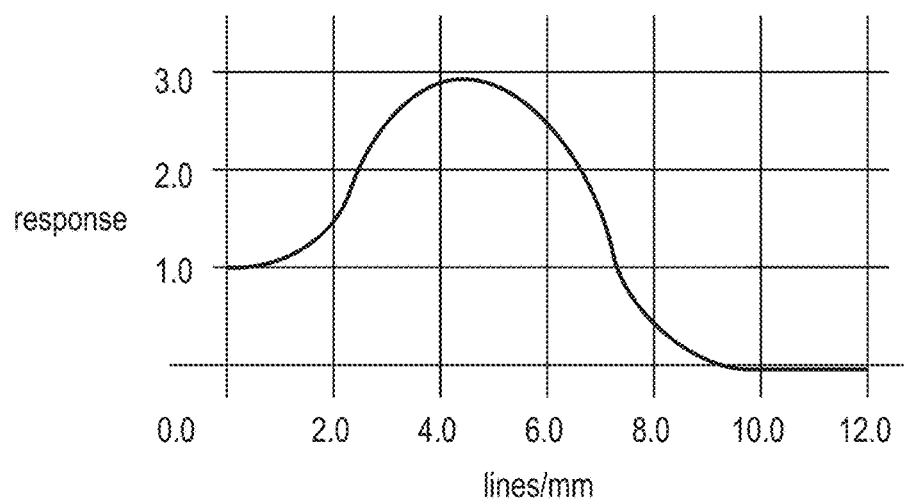
Figure 12C:
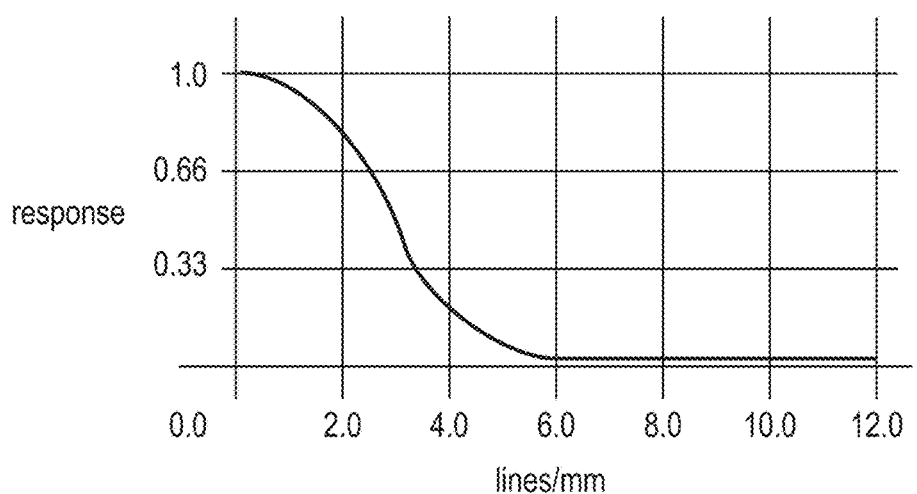

As an example of a frequency characteristic of a filter for performing smoothing here, because the number of lines for halftone dots used in typical printing is 150 to 200 lines, for example a characteristic such that a response for 6 to 7 lines/mm becomes "0" as illustrated by FIG. 12C could be considered.

As an example of a frequency characteristic of a filter for enhancing an edge that is performed after removing the halftone dot structure, a characteristic such that, for example, a response for a high-frequency component of 8 or more lines/mm does not become high as illustrated by FIG. 12B may be considered.

Typical processing performed by the filter processing module 606 above is explained with reference to the flowchart of FIG. 7.

Figure 7:
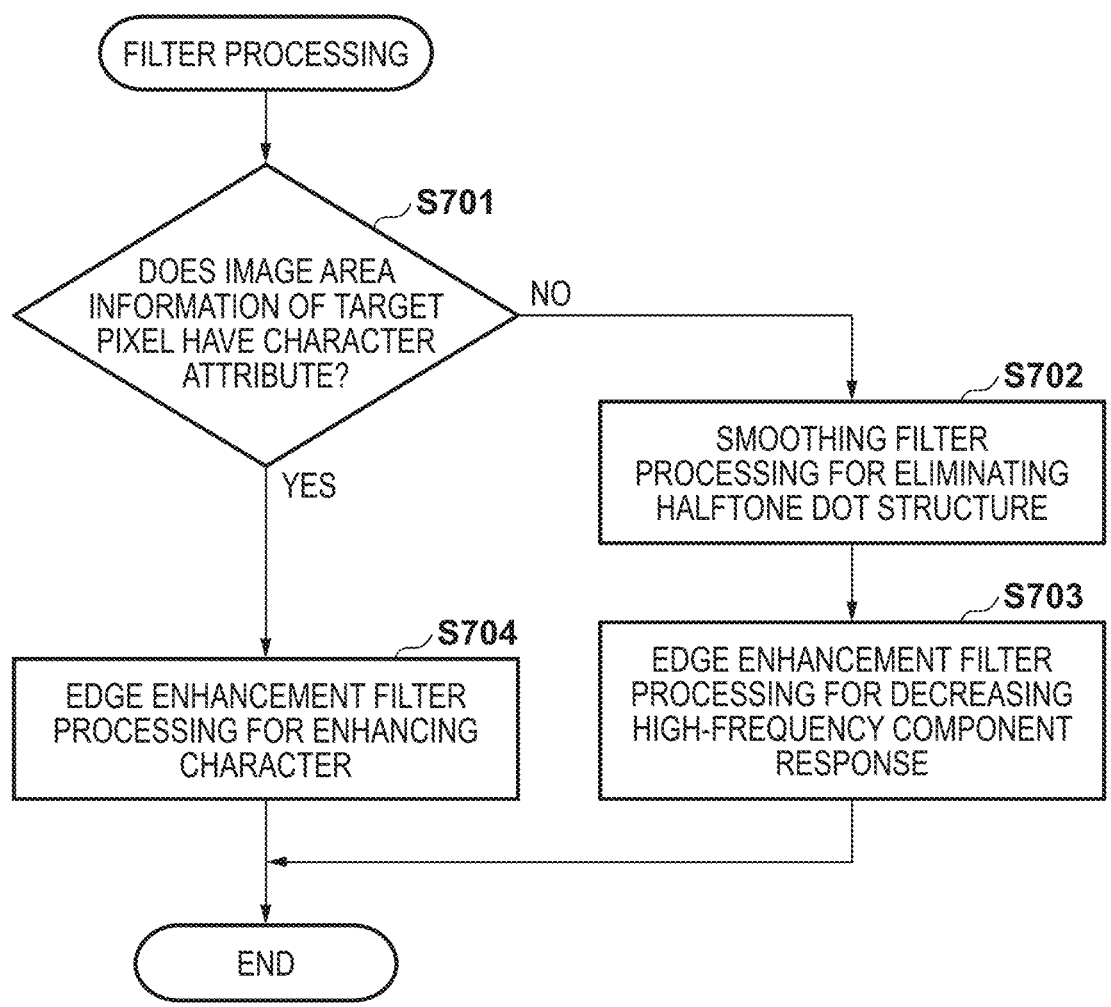
FIG. 7 is a flowchart for describing typical filter processing that a filter processing module executes.

FIG. 7 is a flowchart for describing typical filter processing that a filter processing module executes.

Firstly, in step S701, the CPU 111 determines whether the image area information of a pixel of interest has a character attribute. If the image area information does not have a character attribute, the processing proceeds to step S702, and if the image area information has the character attribute, the processing proceeds to step S704. In step S702, the CPU 111 performs filter processing for performing smoothing to remove a halftone dot structure. Subsequently, the processing proceeds to step S703, and the CPU 111 performs filter processing for enhancing an edge by using a filter having a characteristic for reducing a high-frequency component response, and then this processing ends.

In contrast, in the case of a region having the character attribute, the processing proceeds to step S704, and the CPU 111 performs filter processing using a filter for enhancing a character, and this processing ends.

By this, edge enhancement processing described with reference to FIG. 10A and FIG. 10B is executed on a region having the character attribute. After executing the smoothing processing that was described with reference to FIG. 11 on photograph or other region that is not text, filter processing for enhancing edges using a filter having a characteristic for reducing a high-frequency component response is performed. By this, it is possible to maintain the sharpness of the edge portion even though the halftone dot structure of the photo region is removed.

Here, with reference to FIGS. 12A to 12C and FIGS. 13A through 13D, description is given regarding the frequency characteristic of the filter used in step S704.

Here, description is given for two characteristics: a characteristic 1202 of FIG. 12A which is a characteristic for increasing the response for medium frequency components of 4 to 6 lines/mm, and a characteristic 1201 of FIG. 12A which is a characteristic for increasing the response for high-frequency components of 8 to 10 lines/mm. Here, FIGS. 13A and 13C are each a 5 point thin character in the Mincho typeface as illustrated by the region 401 of FIG. 4, and FIGS. 13B and 13D are each a 12 point (boldfaced type) character in a gothic typeface as in the region 400 of FIG. 4.

Figure 13A:
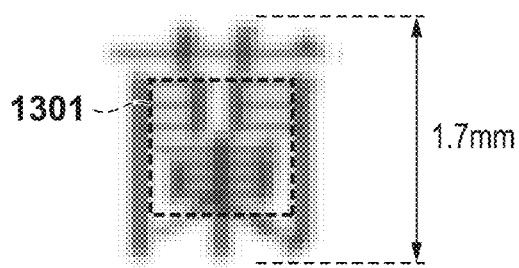
FIGS. 13A through 13D depict views illustrating examples of characters of regions having character attributes.

With respect to an area 1301 which includes a high-frequency component of 8 to 10 lines/mm enclosed by a dotted line out of the 5 point character as illustrated by FIG. 13A, there is an effect as enclosed by the dotted line 1203 of FIG. 12A. Thus, there is an edge enhancement effect for increasing the response, with respect to the characteristic 1201 of FIG. 12A for a filter for increasing a response for high-frequency components of 8 to 10 lines/mm. In other words, there is no edge enhancement effect, because the response, with respect to the characteristic 1202 of FIG. 12A for a filter for increasing a response for medium-frequency frequency components of 4 to 6 lines/mm does not increase.

Figure 13B:
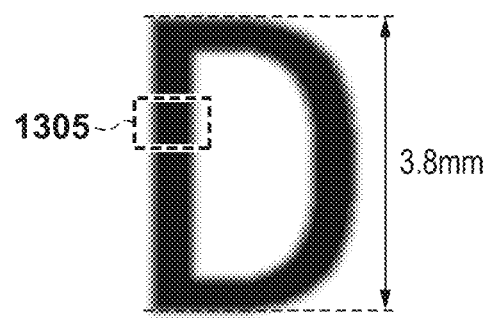
Figure 13C:
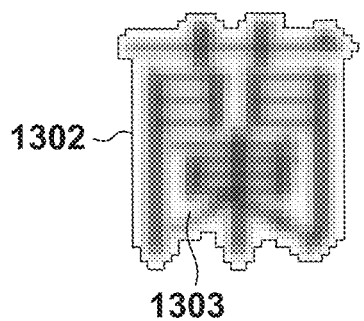
Figure 13D:
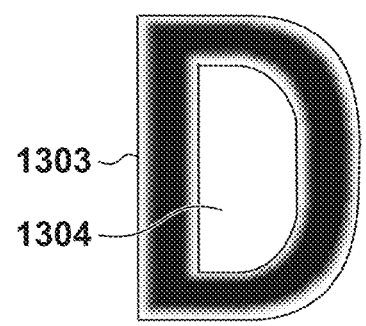

In addition, with respect to a medium frequency component 1305 of 4 to 6 lines/mm which surrounds a 12 point character by a dotted line as illustrated by FIG. 13B, an effect as enclosed by a dashed-dotted line 1204 of FIG. 12A is indicated. In other words, an edge enhancement effect for the characteristic 1201 of the filter for increasing the response of high-frequency components of 8 to 10 lines/mm is deficient in comparison to an edge enhancement effect for the characteristic 1202 of the filter for increasing the response of medium frequency components of 4 to 6 lines/mm.

Accordingly, with respect to such a problem, in the first embodiment, firstly analysis of spatial frequencies of image data is performed. A solution is attempted by performing filter processing that uses a filter having a characteristic for increasing the response of high-frequency components when it is determined that high-frequency components are included, and uses a filter for increasing the response of medium-frequency components if it is not determined that high-frequency components are included. The processing of step S704 which is performed by the filter processing module 606 above is explained with reference to the flowchart of FIG. 8.

Figure 8:
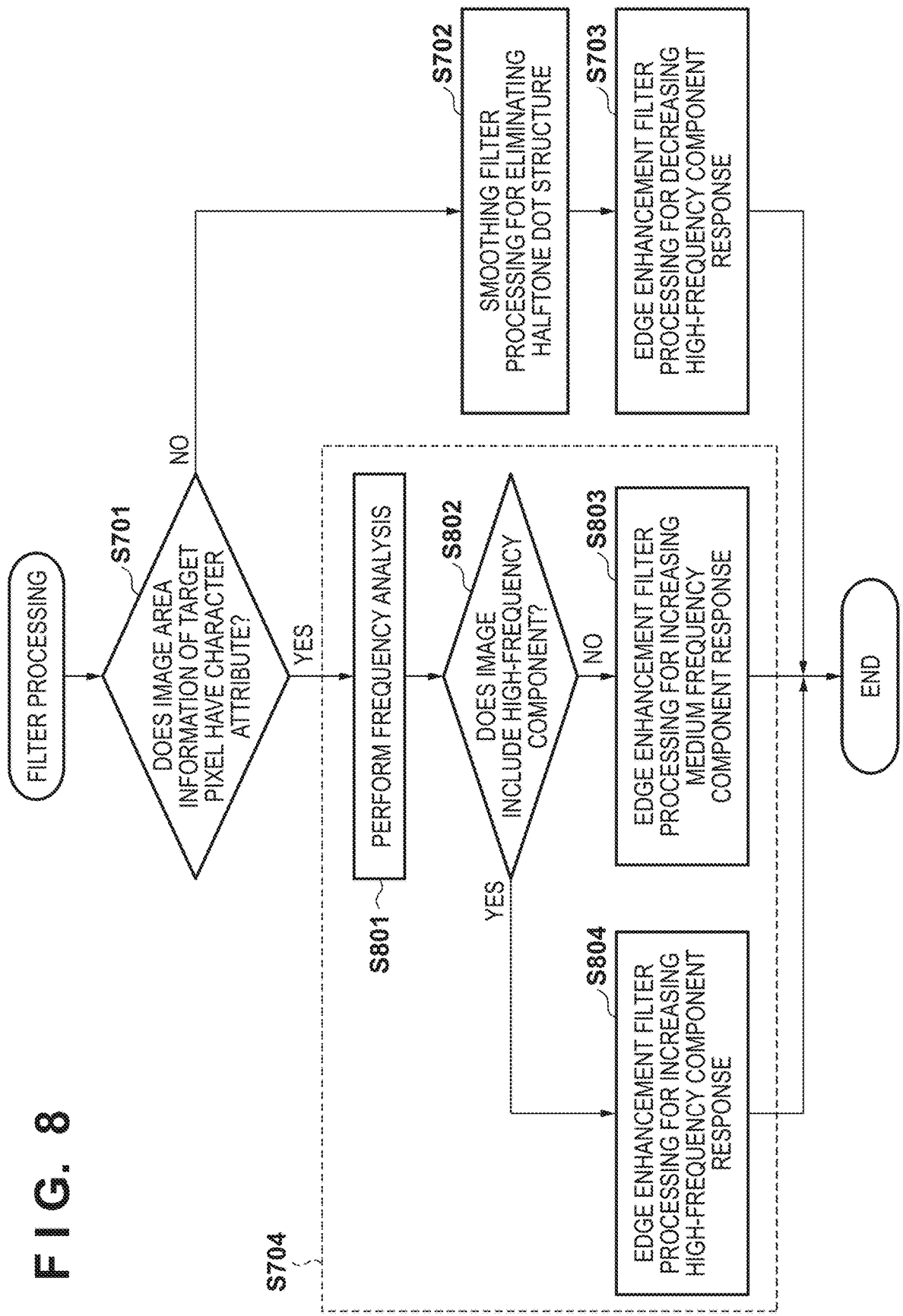
FIG. 8 is a flowchart for describing filter processing that a filter processing module according to the first embodiment executes.

FIG. 8 is a flowchart for describing filter processing that is executed by the filter processing module 606 according to the first embodiment. Note that this processing is achieved by the CPU 111 executing a program that has been deployed to the RAM 113 previously described. Note that, in FIG. 8, processing in common with the processing of FIG. 7 which is previously described is indicated by the same reference numerals, and explanation thereof is omitted.

In step S801, the CPU 111 analyzes spatial frequencies for each pixel included in the image data. In step S801, analysis of spatial frequencies in a peripheral region of a predetermined size that includes the target pixel is performed. Next, the processing advances to step S802, and, based on the result of step S801, the CPU 111 determines whether this is a region that includes a high-frequency component, and if it is a region that includes a high-frequency component, then the processing proceeds to step S804. However, in the case of a region that does not include the high-frequency component, the processing proceeds to step S803. In step S803, the CPU 111 performs filter processing on the target pixel by using a filter having a characteristic for increasing a medium-frequency component response, and then this processing ends. On the other hand, in a case of a region that includes the high-frequency component, in step S804, the CPU 111 uses a filter having a characteristic for increasing the response of high-frequency components, and performs filter processing on the target pixel.

Here, the analysis of spatial frequencies performed in step S801 may be analysis by a well known technique such as a Fourier transform on an image region of a certain size around a target pixel, and may be a decision in accordance with whether there is a high-frequency component that in general exceeds 8 lines/mm. If the analysis is that there is no high-frequency component, a filter having a characteristic of increasing the response of a medium frequency component of 4 to 6 lines/mm is applied, and when it is determined that the spatial frequencies include a high-frequency component, a filter for increasing the response of a high-frequency component of 8 to 10 lines/mm is applied.

By virtue of the first embodiment as described above, because it is possible to apply an optimal filter based on the spatial frequencies of image data, it is possible to sharply express thin portions of a character as well as thick portions of a character. Note that, although spatial frequency analysis is represented as being for every pixel, it may be performed for just a particular region such as a text region determined by the image area determination module 607, and it is possible to shorten processing time for analyzing spatial frequencies by reducing the number of regions to analyze.

In addition, in the first embodiment, although two filters are switched in accordance with whether a periphery that includes a pixel of interest includes a high-frequency component, switching may be performed among two or more filters after determining whether there are high frequencies, medium frequencies, or low frequencies.

In addition, in the first embodiment, description is given by primarily taking a character as a target, but of course it is similar for, for example, a graphical object that is not text, and a region where fine objects are dense will be determined as a region that includes high-frequency components.

Second Embodiment

In the first embodiment described above, spatial frequencies of image data are analyzed, and an optimal filter is applied based on a result of this analysis. However, because analysis of spatial frequencies requires an amount of computation, an extensive hardware or software configuration is required. Accordingly, description is given regarding a method of simply analyzing spatial frequencies by using a result of the image area determination module 607, and description is given regarding a relationship with the filter processing module 606. Note that description for details that are the same as those described in the first embodiment is omitted.

Firstly, with reference to FIGS. 13A-13D and FIGS. 14A-14D, description is given for how to obtain an image area for each line thickness for forming a portion of a character, in the image area determination module 607.

Figure 14A:
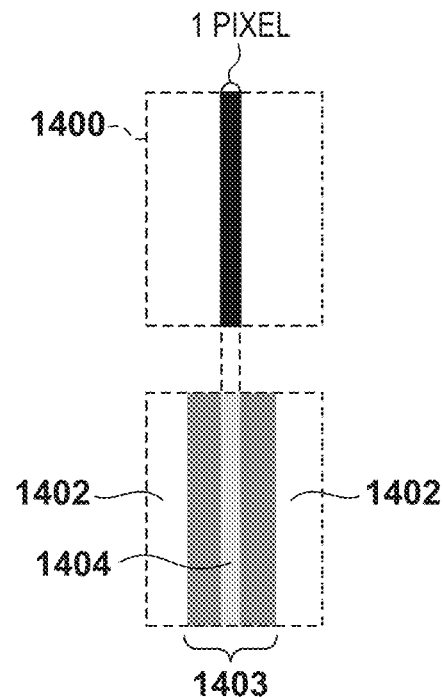
FIGS. 14A through 14D depict views for describing results of determinations of image area determination processing by an image area determination module.

Firstly, description is given regarding attributes for a line 1400 of FIG. 14A which is 1 pixel wide and does not have a background. The image area determination module 607 determines the background as a background attribute 1402, and the line as an edge attribute 1404. The line and both sides thereof are determined to have a character attribute 1403. Accordingly, the line 1400 has an edge attribute 1404 and also has the character attribute 1403.

Figure 14B:
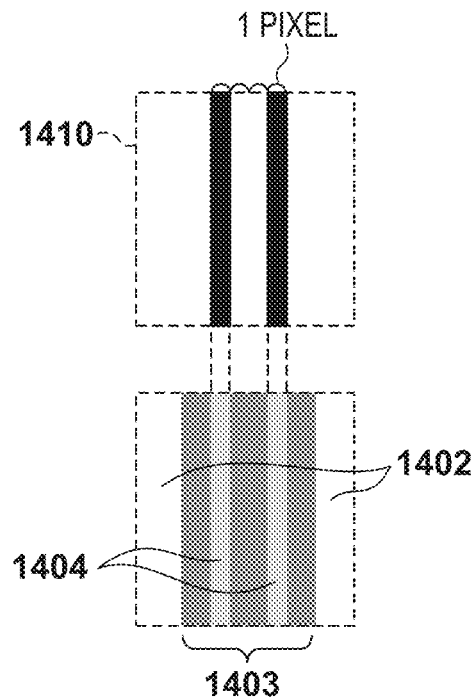

In addition, as in FIG. 14B, description is given regarding attributes for lines 1410 which is where one line that has no background and is one pixel wide is separated from another pixel of the same line by a pixel width of 1 or 2 pixels. The image area determination module 607 determines that the background has a background attribute 1402, and that the line has the edge attribute 1404. The line and both sides thereof are determined to have the character attribute 1403. Here, as a result of thickening the edge attributes, the gap between the two lines is connected by the character attribute.

Consequently, with a 5 point Mincho typeface character, as illustrated by FIG. 13C for example, as an image having a high-frequency component where thin lines such as lines with gaps therebetween of 1 or 2 pixels, fine dots, or the like are densely distributed, a portion 1302 that covers the entire character will be determined to have the character attribute 1403. Accordingly, the white background 1303 between the thin lines in the character is also determined to have the character attribute 1403.

Figure 14C:
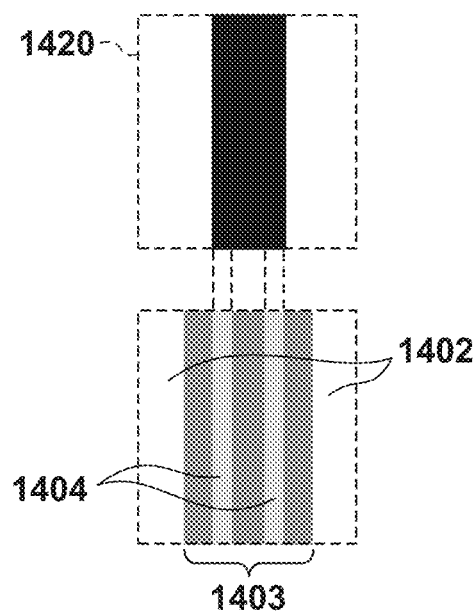

Next, description is given regarding attributes for a line 1420 which is 7 or 8 pixels wide and does not have a background, as in FIG. 14C. The image area determination module 607 determines the background to have the background attribute 1402, and the edge portion of the lines to have the edge attribute 1404. Both sides determined to have edge attributes are determined to have the character attribute 1403. As a result of thickening each edge attribute, the gap between edge attributes is connected by a character attribute.

Consequently, as an image having low to medium frequency components with lines of 7 to 8 pixels where the lines are not dense, a region 1303 that surrounds a 12 point gothic typeface character as illustrated by FIG. 13D for example is determined to have the character attribute 1403. However, the white portion 1304 in the middle of the character is determined to have the background attribute 1402.

Figure 14D:
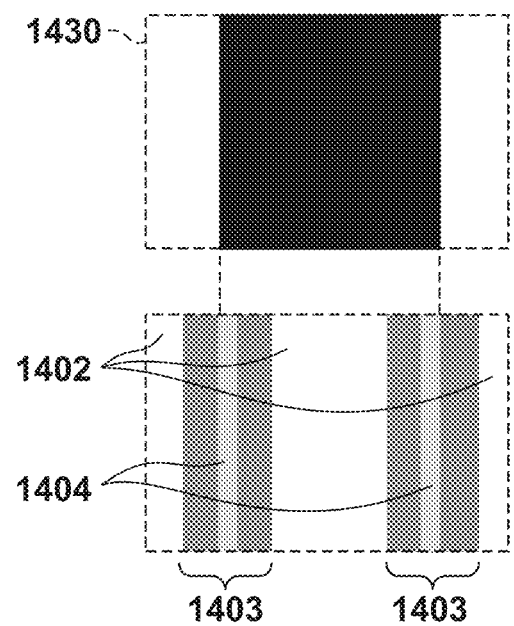

Finally, description is given for attributes for a line 1430 of FIG. 14D which is thicker than the relatively thick line 1420 of FIG. 14C. The image area determination module 607 determines the background to have the background attribute 1402, and the edge portion of the lines to have the edge attribute 1404. Both sides determined to have edge attributes are determined to have the character attribute 1403. The gap between edges differs to that in FIG. 14C, and the inside of the character is not connected by a character attribute, and is determined to have the background attribute 1402 because the pixel values are uniform.

Consequently, as an image having low to medium frequency components with lines exceeding 10 pixels where lines are not dense, for example, an edge portion such as for a 15 point gothic typeface character (not shown) is determined to have the character attribute 1403, and the gap between edges is determined to have the background attribute 1402.

This ends the description regarding how to obtain an image area for each line thickness for forming a portion of a character.

Next, description is given regarding a method for determining whether a pixel of interest (hereinafter, referred to as a target pixel) is a high-frequency component.

For example, in the area 1301 enclosed by the dotted line in FIG. 13A, as described previously, the character attribute continues across a portion in which thin lines, as illustrated by FIG. 14B, are dense above, and the background attribute does not appear. Accordingly, if the target pixel and pixels in the periphery thereof (hereinafter referred to as reference pixels) have the character attribute, it is a high-frequency component.

In contrast, in a case where thin lines are not dense as with FIGS. 14A, 14C, and 14D, only edge portions of a line are determined to have character attributes, and a background attribute appears in a periphery of where having a character attribute is determined.

Note that, for the character attribute 1403 present in the character of FIG. 14C, for a 7×7 or 5×5 filter, because the reference pixels thereof are where the pixel values of the same character are all approximately equal signals, when performing weighting it is possible to ignore differences in filter coefficients because they are low.

Figure 9:
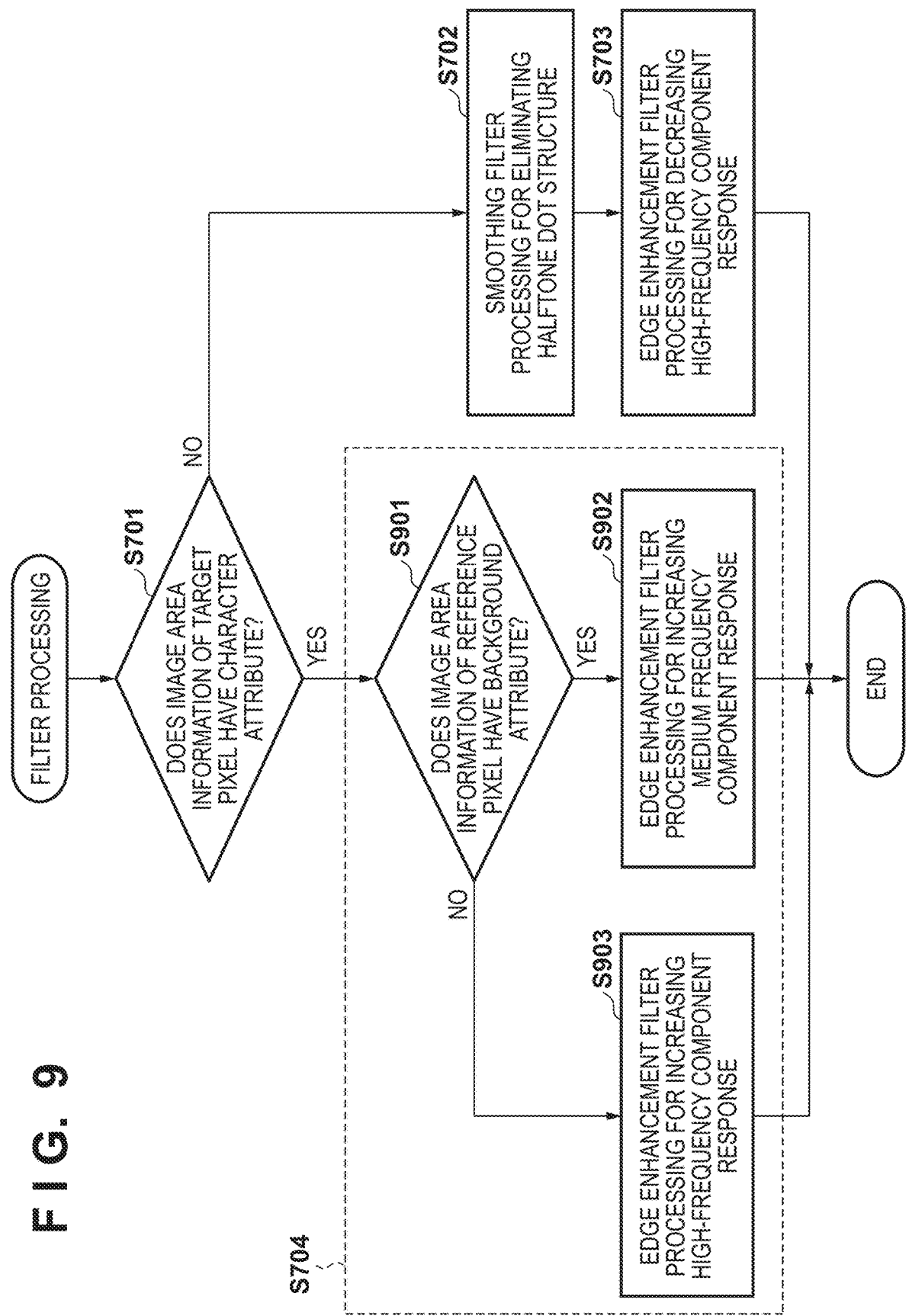
FIG. 9 is a flowchart for describing filter processing that a filter processing module according to the second embodiment executes.

Consequently, processing performed by the filter processing module 606 in step S704 is described using step S901 through step S903 which are illustrated by FIG. 9.

FIG. 9 is a flowchart for describing filter processing that is executed by the filter processing module 606 according to the second embodiment. Note that this processing is achieved by the CPU 111 executing a program that has been deployed to the previously described RAM 113. Note that, in FIG. 9, processing in common with the processing of FIG. 7 which is previously described is indicated by the same reference numerals, and explanation thereof is omitted.

Firstly, in step S701, the CPU 111 determines whether or not image area information of the target pixel has a character attribute. If the image area information of the target pixel has the character attribute, the processing proceeds to step S901, and otherwise the processing proceeds to step S702. Here, description of step S702 and step S703 is the same as that in the first embodiment, and is thus omitted. In step S901, the CPU 111 determines whether or not the image area information of the reference pixel has a background attribute. When the image area information of the reference pixel has the background attribute, the processing proceeds to step S902, and otherwise the processing proceeds to step S903. In step S902, the CPU 111 performs filter processing on the target pixel by using a filter having a characteristic for increasing a medium-frequency component response, and then this processing ends. In contrast, in step S903, the CPU 111 performs filter processing on the target pixel by using a filter having a characteristic for increasing a high-frequency component response, and then this processing ends.

A filter having a characteristic for increasing the response of a medium frequency component or a characteristic for increasing the response of a high-frequency component is the same as that in the first embodiment, and thus description thereof is omitted.

Consequently, by referring to the attributes of the periphery of the pixel, it is possible to simply analyze spatial frequencies and determine whether or not the pixel is a high-frequency component, and it is possible to apply an optimal edge enhancement filter. By this, it is not necessary to analyze spatial frequencies using an extensive hardware or software configuration, as in the first embodiment.

Note that it is possible to adjust a high-frequency component region by a reference region of reference pixels. For example, by picking reference pixels in a narrow region, it is possible to determine a high-frequency component for only 10 to 12 lines/mm for example, and by picking reference pixels in a wide region, it is possible to determine a high-frequency component of 8 to 12 lines/mm, for example.

In addition, although analysis of spatial frequencies and a determination as to whether there is a high-frequency component is performed by referring to attributes of a periphery of a pixel in the second embodiment, configuration may be taken to count a number of thin lines or a number of lines determined to have an edge attribute among reference pixels in a periphery of a target pixel. Here, if there is a large number of thin lines or a large number of lines determined to be edges, it is possible to determine that the reference pixels including the target pixel are an image that includes a high-frequency component.

Other Embodiments

Embodiments of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-48400, filed Mar. 15, 2018, which is hereby incorporated by reference herein in its entirety.

What is claimed is:

1. An information processing apparatus comprising:
a controller, having at least one processor which executes instructions stored in a memory, one or more circuitry, or, a combination of the at least one processor and the one or more circuitry, being configured to:
detect character data from image data;
execute edge enhancement processing, using a first filter, on an edge portion of a region, out of the detected character data, that includes a region whose frequency of points or lines is greater than a predetermined frequency; and
execute edge enhancement processing, using a second filter, on an edge portion of a region, out of the detected character data, that does not include a region whose frequency of points or lines is greater than the predetermined frequency, wherein the first filter has, in comparison to the second filter, a larger degree for edge enhancement with respect to a region having a frequency higher than the predetermined frequency.

2. The image processing apparatus according to claim 1, wherein the controller is configured to:
execute edge enhancement processing, using the first filter, on an edge portion of a region, out of the detected character data, that includes a spatial frequency greater than a predetermined spatial frequency, and
execute edge enhancement processing, using the second filter, on an edge portion of a region, out of the detected character data, that does not include a spatial frequency greater than the predetermined spatial frequency.

3. The image processing apparatus according to claim 2, wherein the first filter is an edge enhancement filter for increasing a response for 8 lines/mm or more, and the second filter is an edge enhancement filter for increasing a response for 4 to 6 lines/mm.

4. The image processing apparatus according to claim 2, wherein the controller is configured to further:
perform third filter processing for performing, on image data of a region determined to include halftone dots, smoothing to remove a halftone dot structure of the image data, and then perform processing for enhancing edges.

5. The image processing apparatus according to claim 4, wherein a filter used in the third filter processing has a frequency characteristic for setting a response for 6 to 7 lines/mm to 0, and a filter used in the processing for enhancing the edges has a frequency characteristic such that a response for a high-frequency component of 8 lines/mm or more does not increase.

6. The image processing apparatus according to claim 1, wherein the controller is configured to, in a detection of character data, detect the character data from the image data based on edge information extracted in accordance with edge extraction processing with respect to the image data.

7. The image processing apparatus according to claim 2, wherein the first filter enhances an edge of a character region by removing a pixel to which edge information extracted in accordance with edge extraction processing with respect to the image data is associated.

8. The image processing apparatus according to claim 2, wherein the spatial frequency higher than the predetermined spatial frequency is a spatial frequency that exceeds 8 lines/mm.

9. The image processing apparatus according to claim 1, wherein the controller is configured to:
execute edge enhancement processing, using the first filter, on an edge portion of a region, out of the detected character data, that includes a spatial frequency greater than 8 lines/mm, and
execute edge enhancement processing, using the second filter, on an edge portion of a region, out of the detected character data, that includes a spatial frequency of 4 to 6 lines/mm.

10. The image processing apparatus according to claim 1, wherein the image data is inputted by reading an original.

11. An image processing method of an image processing apparatus, the image processing method comprising:
detecting character data from image data;
executing edge enhancement processing, using a first filter, on an edge portion of a region, out of the detected character data, that includes a region whose frequency of points or lines is greater than a predetermined frequency; and executing edge enhancement processing, using a second filter, on an edge portion of a region, out of the detected character data, that does not include a region whose frequency of points or lines is greater than the predetermined frequency, wherein the first filter has, in comparison to the second filter, a larger degree for edge enhancement with respect to a region having a frequency higher than the predetermined frequency.

12. A non-transitory computer-readable storage medium storing a program for causing a processor to execute an image processing method of an image processing apparatus, the image processing method comprising:

detecting character data from image data;

executing edge enhancement processing, using a first filter, on an edge portion of a region, out of the detected character data, that includes a region whose frequency of points or lines is greater than a predetermined frequency; and executing edge enhancement processing, using a second filter, on an edge portion of a region, out of the detected character data, that does not include a region whose frequency of points or lines is greater than the predetermined frequency, wherein the first filter has, in comparison to the second filter, a larger degree for edge enhancement with respect to a region having a frequency higher than the predetermined frequency.

* * * * *